April 23, 1957 J. B. WINTHER 2,790,139
TUBE ANALYZER
Filed April 12, 1954 3 Sheets-Sheet 1

Jerrold B. Winther,
Inventor.
Hoenig and Pope,
Attorneys.

April 23, 1957  J. B. WINTHER  2,790,139
TUBE ANALYZER

Filed April 12, 1954  3 Sheets-Sheet 3

# United States Patent Office 2,790,139
Patented Apr. 23, 1957

2,790,139

TUBE ANALYZER

Jerrold B. Winther, Kenosha, Wis.

Application April 12, 1954, Serial No. 422,461

11 Claims. (Cl. 324—27)

This invention relates to tube analyzers and more particularly to phanotron tube analyzers.

Among the several objects of the invention may be noted the provision of a tube analyzer for determining the condition of a phanotron tube within prescribed performance limits; the provision of a phanotron tube analyzer which may be operated and the test results easily interpreted by nontechnical personnel; the provision of an analyzer of the class described which permits observation of tube characteristics under static or dynamic conditions; the provision of a phanotron tube analyzer which will indicate the average arc-drop voltage in the tube; and the provision of analyzers of the class described which will record the characteristic curve of the particular phanotron tube being tested. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a circuit diagram of a phanotron tube analyzer of the present invention;

Corresponding reference characters indicate corresponding parts throughout the several views of the drawings.

Figure 1:
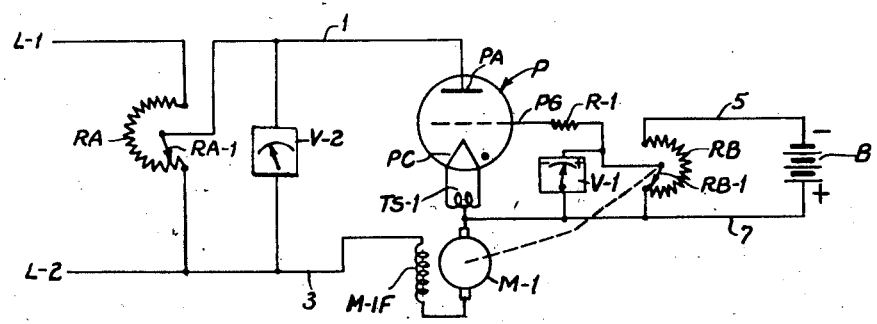

Referring now to the drawings and more particularly to Fig. 1, a phanotron tube is indicated generally at P. By phanotron tube I mean any gas-filled electronic tube having a thermionic cathode and an anode, and which may or may not have one or more additional electrodes, such as a control grid for controlling unidirectional current flow. This phanotron tube P may be, for example, a thyratron type gaseous discharge tube including a control grid PG, an anode PA and a cathode PC. Cathode PC is illustrated as being a directly heated type, energized by a transformer secondary TS–1. An A. C. voltage source L–1, L–2 is connected across a variable resistor or potentiometer RA. A variable A. C. voltage source is thereby provided across a rotor RA–1 and line L–2. An electric circuit including this variable A. C. voltage source interconnects cathode PC and anode PA by means of wires 1 and 3 (and any of the customary means, such as a tube socket, for receiving a tube to be tested) to establish a variable A. C. potential between these two electrodes. The electrical connection to the cathode PC by wire 3 is completed through a D. C. motor M–1, its associated series field M–1F and a center tap of transformer secondary TS–1.

A D. C. voltage source, such as a battery B, is connected by wires 5 and 7 across a variable resistor or potentiometer RB to provide a variable D. C. voltage source across a rotor RB–1 and wire 7. A second electrical circuit including this variable D. C. voltage source interconnects grid PG with cathode PC (via a grid resistor R–1) to establish a variable D. C. potential between these two electrodes. A voltmeter V–1 serves to indicate the D. C. grid-cathode potential, and a voltmeter V–2 serves to indicate the A. C. cathode-anode potential. As the conventional A. C. voltmeter is calibrated to record R. M. S. values, V–2 is specifically recalibrated to record maximum voltage values (1.414 times R. M. S.). Motor M–1 is mechanically linked (as indicated by the dashed line) to rotor RB–1 and upon energization of the motor it will be actuated to vary the D. C. potential.

Operation is as follows:

Rotor RB–1 initially is set to the position shown in Fig. 1 and thereby establishes a minimum D. C. potential between grid PG and cathode PC. With rotor RA–1 also set as illustrated, a minimum A. C. potential is established between anode PA and cathode PC. Under these conditions the phanotron tube P under test will not conduct. Conduction is instituted by slowly advancing rotor RA–1 in a clockwise direction to increase the A. C. anode-cathode potential to a level sufficiently high to cause tube P to fire. As soon as this occurs the resultant flow of current through tube P, the series field M–1F and the motor armature M–1 will actuate the latter to move rotor RB–1 in a counterclockwise direction. This movement of rotor RB–1 increases the D. C. grid-cathode potential in a negative direction until grid PG is sufficiently negative relative to cathode PC to prevent further conduction of tube P. The D. C. grid-cathode potential at this critical level is indicated on voltmeter V–1 and the A. C. anode-cathode potential is indicated on voltmeter V–2. This information is plotted as point 1–A as indicated on Fig. 2 in which the D. C. grid-cathode potential is represented along the axis of abscissas, and the A. C. anode-cathode potential is represented along the axis of ordinates.

Rotor RA–1 is then manually moved clockwise another increment to increase the A. C. anode-cathode potential to a value which causes tube P to again conduct. Following the action of motor M–1 described above, rotor RB–1 is accordingly moved counterclockwise to increase the D. C. grid-cathode potential in a negative direction until a critical grid-cathode potential is again reached and tube P thereupon discontinues conduction. The potential values indicated on meters V–1 and V–2 are plotted as point 1–B of Fig. 2.

Figure 2:
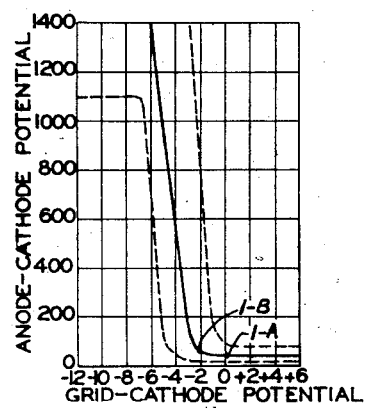
Fig. 2 is a chart graphically representing a typical recorded characteristic curve of a phanotron tube tested by an analyzer of the present invention.

It can be seen that by continuing this procedure a solid-line curve such as indicated in Fig. 2 can be plotted for any tube P being tested. The dashed-line curves of Fig. 2 are representative of the permissible limits of deviation of the actual plotted characteristic curve of any tube P.

Figure 3:
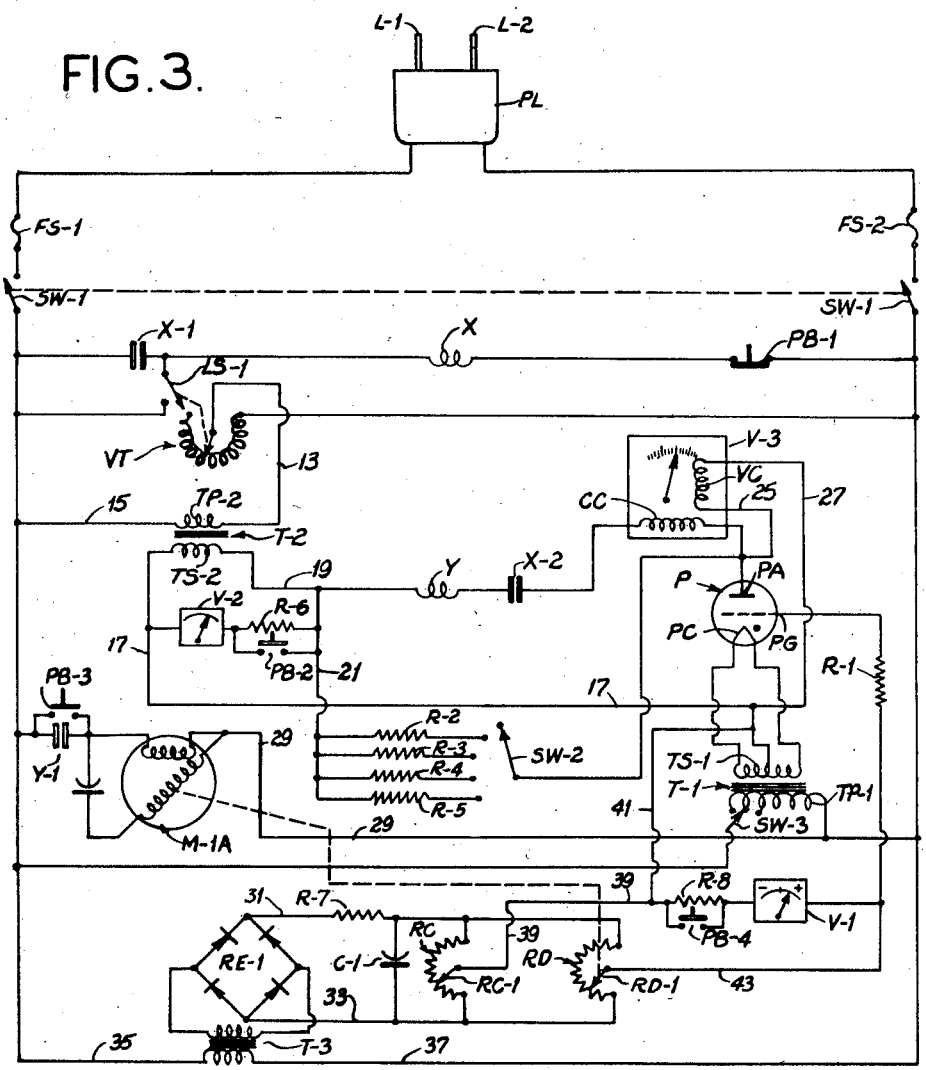
Fig. 3 is a circuit diagram of a second phanotron tube analyzer embodiment of the present invention.

A second embodiment of the present invention is illustrated in Fig. 3. The A. C. voltage source L–1, L–2 is connected (via a power line plug PL, line fuses FS–1 and FS–2, and a double-pole line switch SW–1) to a variable voltage transformer VT. Also connected across L–1, L–2 is a control circuit comprising a relay coil X series-connected with a set of contacts X–1 (adapted to be actuated to a closed condition by energization of coil X) and a normally closed push-button switch PB–1. A limit switch LS–1 mechanically linked, as indicated by the dashed line, with voltage transformer VT is connected between contacts X–1 and one side of VT.

Transformer VT is connected by means of wires 13 and 15 to a primary TP–2 of transformer T–2, the secondary TS–2 of which provides a variable A. C. potential. This variable A. C. potential is applied between the anode and cathode of tube P by connecting one side of secondary TS-2 to the center tap (which serves as the cathode connection) of the secondary TS-1 of filament transformer T-1 through a wire 17. The other side of secondary TS-2 is connected to anode PA through a circuit including a wire 19, a relay coil Y, a second set of relay contacts X-2 (adapted to be closed only during energization of relay coil X) and a current coil CC of a wattmeter V-3. A plurality of shunt resistors R-2, R-3, R-4 and R-5 and a tap switch SW-2 are connected in shunt across the above series circuit including current coil CC. The A. C. anode-cathode potential is indicated by voltmeter V-2, which is connected across secondary TS-2 in a circuit including a resistor R-6 adapted to be shunted by a normally open push button switch PB-2. Wattmeter V-3 also includes a voltage coil VC connected by wires 25 and 27 to anode PA and cathode PC, respectively. Primary TP-1 of filament transformer T-1 is adapted to be variably energized by means of a tap switch SW-3 to supply any of a number of preselected filament voltages to the tube P being tested.

An A. C. motor M-1A is connected by wire 29 and a set of switch contacts Y-1 (adapted to be closed only during energization of its controlling relay coil Y) across power source L-1, L-2. A push-button switch PB-3 is shunt-connected across contacts Y-1.

A D. C. voltage source is provided at wires 31 and 33 by connecting a bridge rectifier RE-1 to a transformer T-3 energized by A. C. power source L-1, L-2 via wires 35 and 37. The pulsating D. C. output of bridge RE-1 is filtered by condenser C-1 and connected via a series resistor R-7 to a variable resistor or potentiometer RC, a rotor RC-1 of which is connected by wires 39 and 41 to cathode PC. Also connected to filtered D. C. output of rectifier RE-1 is another variable resistor RD having a rotor RD-1 connected by wire 43 to grid PG. A circuit including voltmeter V-1 and a resistor R-8 is connected between wires 39 and 43. A push-button switch PB-4 is shunt-connected across resistor R-8.

Operation is as follows:

Upon moving the rotor of the variable voltage transformer VT to its maximum clockwise position, limit switch LS-1 is closed thereby connecting relay coil X to the A. C. power lines L-1, L-2 when switch SW-1 is closed. Energization of relay coil X closes the contacts X-1 and X-2, the former serving as a holding circuit to maintain coil X energized when LS-1 is reopened by moving the arm of transformer VT away from its minimum position. Rotors RC-1 and RD-1 are initially adjusted so that the D. C. grid-cathode potential is a minimum or the grid is positive with respect to the cathode. The rotor of transformer VT is then moved counterclockwise, which increases the A. C. anode-cathode potential applied to tube P until conduction occurs.

The firing of tube P causes current to flow through closed contacts X-2 and relay coil Y which in turn actuates its associated contacts Y-1. This latter action completes the circuit of motor M-1A which is mechanically linked (as indicated by the dashed line) to rotor RD-1. Rotor RD-1 is thereby moved in a direction to increase the D. C. grid-cathode potential in a negative direction to its critical level and thus interrupt the conduction of tube P. The values indicated at V-1 and V-2 may then be plotted graphically.

As described previously in regard to the operation of the Fig. 1 embodiment, further incremental advancement of voltage transformer VT results in repetitive energization of motor M-1A and a corresponding series of movements of RD-1, voltmeter V-1 indicating the critical D. C. grid-cathode potential for each step. The characteristic curve of any tube P can thus be determined; graphically plotted, if desired, and compared to the limits established by the manufacturer.

Push button PB-3 is provided to manually energize motor M-1A to move rotor RD-1 to any predetermined position. Rotor RD-1 is preferably continuously rotatable (the resistance of RD, for example, being spread out over 360°) and it may be brought to a starting position by actuation of PB-3. Push buttons PB-2 and PB-4 shunt resistors R-6 and R-8, respectively, to increase the effective sensitivity of meters V-1 and V-2. Push button PB-1 serves as an off switch and breaks the circuit to relay coil X. The later, as noted earlier, can be reenergized only upon manual return of the rotor of voltage transformer VT to its minimum voltage setting, thus closing switch LS-1.

The operation of Fig. 3, so far as it has been described, differs from that of Fig. 1 in several respects. First, an A. C. motor actuated in response to relay energization, rather than a D. C. motor directly connected in the anode-cathode circuit, moves the rotor of a grid-cathode potentiometer. Second, the means for varying the A. C. voltage source is a variable voltage transformer rather than a variable resistor or potentiometer. Third, a limit switch is provided which insures that the A. C. voltage source must be returned to a minimum setting at the initiation of each testing operation. Fourth, rectified A. C. rather than a battery is the D. C. voltage source.

In addition to obtaining the characteristic curve of tube P, the Fig. 3 analyzer also provides means for determining the average arc-drop voltage in the tube P being tested. By recording the average arc-drop values obtained by tests at various times during the life of the tube, the end of the tube's life can be predicted with considerable accuracy. That is, a rapid increase in average arc-drop voltage indicates that the end of tube usefulness is fast approaching. However, the measurement of arc-drop voltage is complicated by the fact that tube P acts as a half-wave rectifier. Because of the resulting pulsating nature of the current through tube P, a regular voltmeter will not indicate a correct value of arc-drop voltage. Application of a D. C. potential across the anode-cathode circuit with the resulting conduction of steady D. C. is not satisfactory because of the tube's cathode characteristics.

The analyzer of the Fig. 3 embodiment overcomes these difficulties by connecting the variable A. C. voltage source to voltage coil VC of wattmeter V-3 and connecting current coil CC in the cathode-anode circuit. Wattmeter V-3 is directly calibrated in arc-drop volts and indicates the average arc-drop voltage of the tube P under test. In order to test various types of tubes without modifying the current flow (preferably maintained constant at, for example, 0.25 ampere) through current coil CC, shunt resistors R-2 to R-5 and switch SW-2 are provided. As the current through the wattmeter is constant, the reading of V-3 will vary directly with voltage and indicate the arc-drop voltage of any type tube under test. A single adjustable or variable resistor could be used in place of resistors R-2 to R-5.

Figure 4:
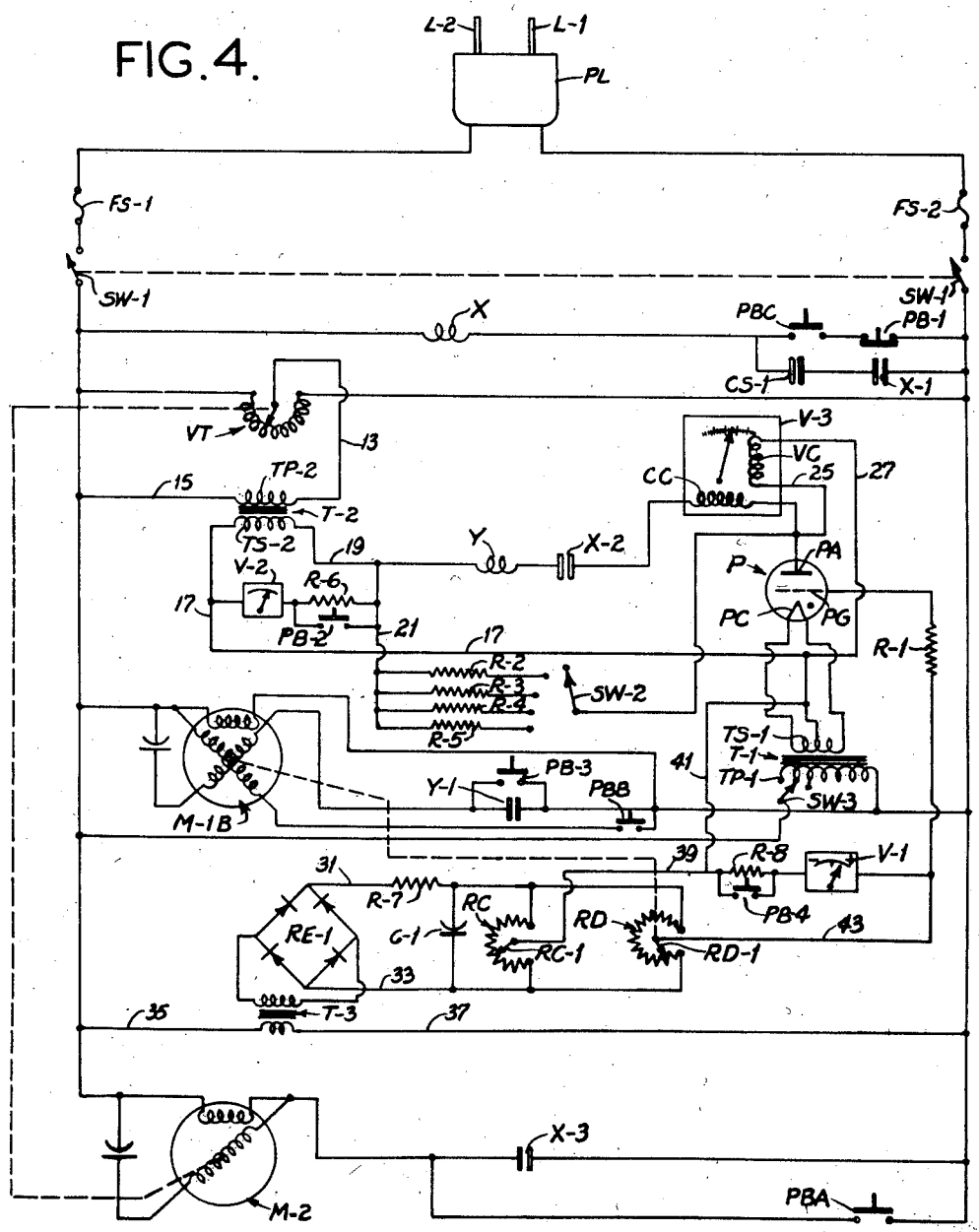
Fig. 4 is a circuit diagram of a third phanotron tube analyzer embodiment of the present invention; and, Fig. 5 is a semidiagrammatic view illustrating a recorder such as may be employed for recording the stated characteristic curve.

Referring now to Fig. 4, a third embodiment of the present invention is illustrated. The organization of this embodiment is similar to that illustrated in Fig. 3 and described above. Certain important distinctions will be noted. First, variable voltage transformer VT is mechanically linked (as indicated by a dashed line) to a motor M-2, and thus is adapted to be driven automatically in a counterclockwise direction. A third set of contacts X-3 of relay coil X is connected in series with this motor M-2. Motor M-2 may be energized alternately by closing of contacts X-3 or by manual actuation of a push button PBA connected in shunt with these contacts.

A second difference between the Fig. 3 and 4 embodiments is the employment of a reversible A. C. motor M-1B in place of motor M-1A. Because of the reversibility of motor M-1B, push button PB-3 (for manually operating RD-1 to return it to its initial position) and contacts Y-1 are repositioned. Instead of being connected in the main field circuit, they are connected in one of the auxiliary fields. Contacts Y-1 or push button PB-3 thus functions to energize M-1B to rotate in one direction. Also, a push button PBB is provided to enable the operator manually to actuate motor M-1B in the opposite direction to rotate rotor RD-1 in a reverse direction.

One further feature of the Fig. 4 apparatus not possessed by the Fig. 3 analyzer is the modified control circuit arrangement for relay coil X. Limit switch LS-1 is eliminated and a cam-operated switch CS-1 is series-connected with contacts X-1 and coil X. Switch CS-1 is mechanically controlled by movement of motor M-2 so that it is closed when transformer VT is moved from its maximum clockwise position (i. e., minimum A. C. anode-cathode potential) and remains closed until VT reaches its maximum counterclockwise position, at which point it opens. A shunt path around switch CS-1 and contact X-1 is provided by another push button PBC series-connected with push button PB-1.

Operation of the Fig. 4 analyzer is similar to that described above in regard to Fig. 3. Initially, transformer VT, which is preferably continuously rotatable, should be set to its minimum voltage position by depressing PBA until this setting is reached. This closes CS-1 which would remain open if VT were left positioned at its maximum voltage position. Push button PBC is then depressed to initiate energization of motor M-2 (through closure of contacts X-3). After push button PBC is released (CS-1 remains closed during this period as described above), motor M-2 continues to drive voltage transformer VT at a slow steady rate (e. g., in the order of 3 R. P. M.). This action gradually increases the A. C. anode-cathode potential. Motor M-1B, which is designed to have a maximum rate of travel exceeding that of rotor M-2, will be energized as soon as tube P begins conducting, and will thereby actuate RD-1 to increase the D. C. grid-cathode potential in a negative direction to its critical level. As motor M-2 advances VT at a slow steady pace, it will be seen that RD-1 will tend to follow at a rate just sufficient to maintain a critical D. C. grid-cathode voltage. This operation continues until variable voltage transformer VT reaches its maximum voltage position, at which time CS-1 automatically opens. Opening of switch CS-1 prevents M-2 from automatically returning VT to its initial minimum voltage position and beginning another cycle. As noted above, PB-A may be depressed manually to energize motor M-2, and PBB may be actuated manually to institute reverse rotation of motor M-1B.

Figure 5:
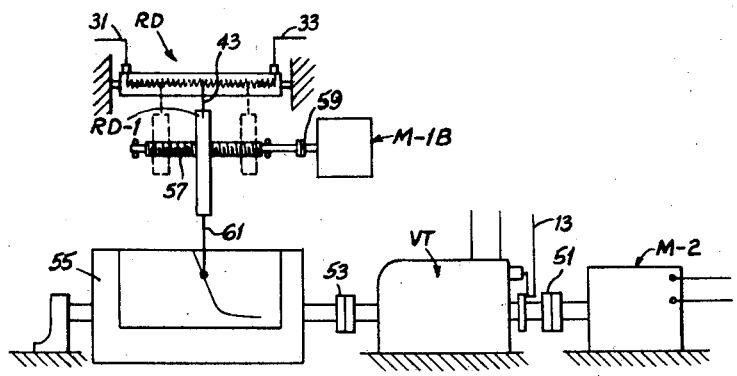

Referring now to Fig. 5, means are illustrated for automatically recording the varying A. C. peak cathode-anode potential versus the critical D. C. grid-cathode potential. Motor M-2 mechanically drives variable voltage transformer VT through a coupling 51. Transformer VT in turn mechanically drives a drum 55 by means of a coupling 53. A paper chart, corresponding generally to that shown in Fig. 2, may be mounted on this drum. RD, illustrated as a slide-type bias resistor, has its contact arm or rotor RD-1 mounted for axial movement by a threaded shaft 57 (coupled to M-1B as indicated at 59). An extension of rotor RD-1, indicated at reference numeral 61, carries a pen or pencil mounted in a plane perpendicular to the chart. By thus mechanically linking rotor RD-1 and transformer VT to the pen extension 61 and drum 55, respectively, the characteristic curve of any phanotron tube P under test can be recorded.

It is to be understood that motor M-1 could be also a shunt or compound type of D. C. motor and that motors M-1A, M-1B and M-2 may be, for example, shaded pole squirrel cage induction motors.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A phanotron tube analyzer comprising means adapted to receive a phanotron tube to be tested, said tube having a control grid and an anode and a cathode, a first electrical circuit including a variable A. C. voltage source interconnecting said cathode and anode to establish an A. C. potential therebetween, means for uninterruptedly varying said A. C. potential, a second electrical circuit including a D. C. voltage source interconnecting said control grid and cathode and adapted to establish a D. C. potential therebetween, means for uninterruptedly varying said D. C. voltage source potential, a first indicator for indicating the A. C. cathode-anode potential, a second indicator for indicating the D. C. grid-cathode potential, and an electric motor adapted to actuate said D. C. potential varying means, said motor being responsive to conduction of said tube to vary said D. C. grid-cathode potential in a negative direction to its critical level and thus cause the tube to cease firing, whereby the relationship between the A. C. cathode-anode potential and the D. C. grid-cathode potential characteristic of the tube being tested is represented by said indicators as said A. C. potential is varied.

2. A phanotron tube analyzer as set forth in claim 1, wherein said electric motor is a D. C. type motor series-connected in said first electrical circuit between said cathode and anode.

3. A phanotron tube analyzer as set forth in claim 1, wherein said electric motor is a reversible motor energized by a relay series-connected in said first electrical circuit between said cathode and anode.

4. A phanotron tube analyzer as set forth in claim 1, further including means for varying said A. C. voltage source potential and a second electric motor adapted to actuate said A. C. potential varying means.

5. A phanotron tube analyzer as set forth in claim 1, further including means for automatically recording the varying cathode-anode and grid-cathode potentials respectively, whereby the characteristic curve of the phanotron tube being tested is recorded as said A. C. potential is varied.

6. A phanotron tube analyzer as set forth in claim 5 further including interlock means for preventing initial energization of said electric motor until said A. C. cathode-anode potential is at a minimum value.

7. A phanotron tube analyzer as set forth in claim 1, further including means for varying said A. C. voltage source potential, a second electric motor adapted to actuate said A. C. potential varying means, and means for automatically recording the varying cathode-anode and grid-cathode potentials respectively, whereby the characteristic curve of the phanotron tube being tested is recorded as said A. C. potential is varied.

8. A phanotron tube analyzer as set forth in claim 7, wherein the second electric motor is adapted to be actuated at a substantially constant rate and the maximum rate of variation of the D. C. grid-cathode potential toward a critical level exceeds the rate of variation of the A. C. cathode-anode potential toward a conducting level.

9. A phanotron tube analyzer as set forth in claim 8 further including switch means responsive to actuation of said A. C. potential varying means to a maximum A. C. potential position to deactuate said second motor.

10. A phanotron tube analyzer comprising means adapted to receive a phanotron tube to be tested, said tube having a control grid and an anode and a cathode, a first electrical circuit including an A. C. voltage source interconnecting said cathode and anode to establish an A. C. potential therebetween, a variable voltage transformer for varying said A. C. voltage source potential, a first electric motor adapted to actuate said voltage transformer to increase said A. C. potential at a substantially constant rate, a second electrical circuit including a D. C. voltage source interconnecting said control grid and cathode and adapted to establish a D. C. potential therebetween, a potentiometer for varying said D. C. voltage source potential, a first indicator for indicating the A. C. cathode-anode potential, a second indicator for indicating the D. C. grid-cathode potential, a relay including a coil series-connected in said first electrical circuit and a pair of contacts adapted to energize a second electric motor, said second motor being adapted when energized to actuate said D. C. potential varying means, the maximum rate of variation of the D. C. grid-cathode potential toward a critical level exceeding the rate of variation of the A. C. cathode-anode potential toward a conducting level, and means for recording the varying A. C. cathode-anode potentials and the varying D. C. grid-cathode potentials, said second motor being responsive to conduction of said tube to vary said D. C. grid-cathode potential in a negative direction and thus cause the tube to cease firing, whereby the characteristic curve of the tube being tested is recorded as said A. C. potential is varied.

11. A phanotron tube analyzer comprising means adapted to receive a phanotron tube to be tested, said tube having a control grid and an anode and a cathode, a wattmeter having a voltage coil and a current coil, a first electrical circuit including an A. C. voltage source and said current coil series-connected with said cathode and anode to establish an A. C. potential therebetween, said voltage coil being shunt-connected across said cathode and anode, an adjustable resistance connected in parallel with said current coil and adapted to maintain the current through said current coil substantially constant regardless of the type tube being tested, a variable voltage transformer for varying said A. C. voltage source potential, a first electric motor adapted to actuate said voltage transformer to increase said A. C. potential at a substantially constant rate, a second electrical circuit including a D. C. voltage source interconnecting said control grid and cathode and adapted to establish a D. C. potential therebetween, a potentiometer for varying said D. C. voltage source potential, a first indicator for indicating the A. C. cathode-anode potential, a second indicator for indicating the D. C. grid-cathode potential, a relay including a coil series-connected in said first electrical circuit and a pair of contacts adapted to energize a second electric motor, said second motor being adapted when energized to actuate said D. C. potential varying means, the maximum rate of variation of the D. C. grid-cathode potential toward a critical level exceeding the rate of variation of the A. C. cathode-anode potential toward a conducting level, and means for recording the varying A. C. cathode-anode potentials and the varying D. C. grid-cathode potentials, said second motor being responsive to conduction of said tube to vary said D. C. grid-cathode potential in a negative direction to its critical level and thus cause the tube to cease firing, whereby the characteristic curve of the tube being tested is recorded as said A. C. potential is varied, and the average arc-drop voltage of said tube is indicated by said wattmeter.

References Cited in the file of this patent

UNITED STATES PATENTS

| | | |
|---|---|---|
| 2,088,317 | Bachelet | July 27, 1937 |
| 2,440,287 | Oravetz | Apr. 27, 1948 |